United States Patent [19]

Hirasawa

[11] Patent Number: 4,647,754

[45] Date of Patent: Mar. 3, 1987

[54] CONSUMABLE ELECTRODE TYPE PULSE ARC WELDING MACHINE

[75] Inventor: Kazushige Hirasawa, Kawanishi, Japan

[73] Assignee: Matsushita Electric Industrial Co., Ltd., Osaka, Japan

[21] Appl. No.: 757,864

[22] Filed: Jul. 22, 1985

[30] Foreign Application Priority Data

Apr. 10, 1984 [JP] Japan .................................. 60-75653
Jul. 31, 1984 [JP] Japan .................................. 59-161315
Jul. 31, 1984 [JP] Japan .................................. 59-161317

[51] Int. Cl.⁴ .............................................. B23K 9/09
[52] U.S. Cl. ........................... 219/130.21; 219/130.01; 219/130.51; 219/137 PS
[58] Field of Search ...................... 219/130.21, 130.01, 219/137 PS, 130.51

[56] References Cited

U.S. PATENT DOCUMENTS

| | | | |
|---|---|---|---|
| 3,632,960 | 1/1972 | Erdmann-Jesnitzer et al. | 219/130.01 |
| 3,673,377 | 6/1972 | Erdmann-Jesnitzer et al. | 219/130.01 |
| 4,518,844 | 5/1985 | Needham | 219/130.21 |

Primary Examiner—Clifford C. Shaw
Attorney, Agent, or Firm—Spencer & Frank

[57] ABSTRACT

A consumable electrode type pulse arc welding machine is provided with means for controlling a welding output of the welding machine and the control means comprises a short-circuiting detector circuit for detecting the number of times of short-circuiting n occurring between an electrode wire and a weld part of a base metal at predetermined time intervals during a welding operation, a processing unit for calculating $n_d = n_s - n$, where $n_s$ is a preset number of short-circuiting times, and a control means for controlling a welding output of the welding machine by decreasing the welding arc voltage in accordance with the magnitude of $n_d$, when $n_d$ is larger than zero, and by increasing the welding arc voltage in accordance with the magnitude of $|n_d|$, when $n_d$ is smaller than zero.

4 Claims, 7 Drawing Figures

CONSUMABLE ELECTRODE TYPE PULSE ARC WELDING MACHINE

BACKGROUND OF THE INVENTION

The present invention relates to a consumable electrode pulse arc welding machine for performing welding by shielding a weld part with a gas containing an inert gas as a main component and continuously feeding a consumable electrode wire (hereinafter referred to simply as an "electrode wire") to the weld part, in which welding voltage control is applied to the welding machine while the electrode wire is transferred to the weld part in the form of spray by using a pulsating welding current (hereinafter referred to simply as "the pulse MIG welding method").

The conventional pulse MIG welding method uses a pulse current so that the molten wire metal is transferred to a base metal positively in the state of spray, and hence it has various different characteristics as compared with what is called the normal MIG welding method using a constant DC current. One of the great differences is that, when the welding output current is low, in the normal MIG welding method, the short-circuiting and the arc generation are alternated to effect welding, while, in the pulse MIG welding method, the molten wire metal may be transferred to the base metal in the form of spray. The spray transfer causes a great difference in a spatter generated as compared with the short-circuiting transfer. That is, the fact that the transfer in the form of spray greatly reduces the generation of a spatter as compared with the normal short-circuiting transfer arc welding is one of remarkable features of the MIG welding method. In the pulse MIG welding method, short-circuiting occurs between the electrode wire and the base metal when an arc voltage is set at a lower level to decrease the arc length. However, if the arc voltage is set to be too low in this case, short-circuiting occurs more frequently and this undesirably increases the generation of a spatter to the same degree as the normal MIG welding method. On the other hand, if the arc voltage is set at a higher level to increase the arc length, the occurrence of short-circuiting between the electrode wire and base metal is reduced, however, the arc is likely to become unstable, with the result that no arc occurs at a desired position, thereby making satisfactory welding impossible.

Figure 1:
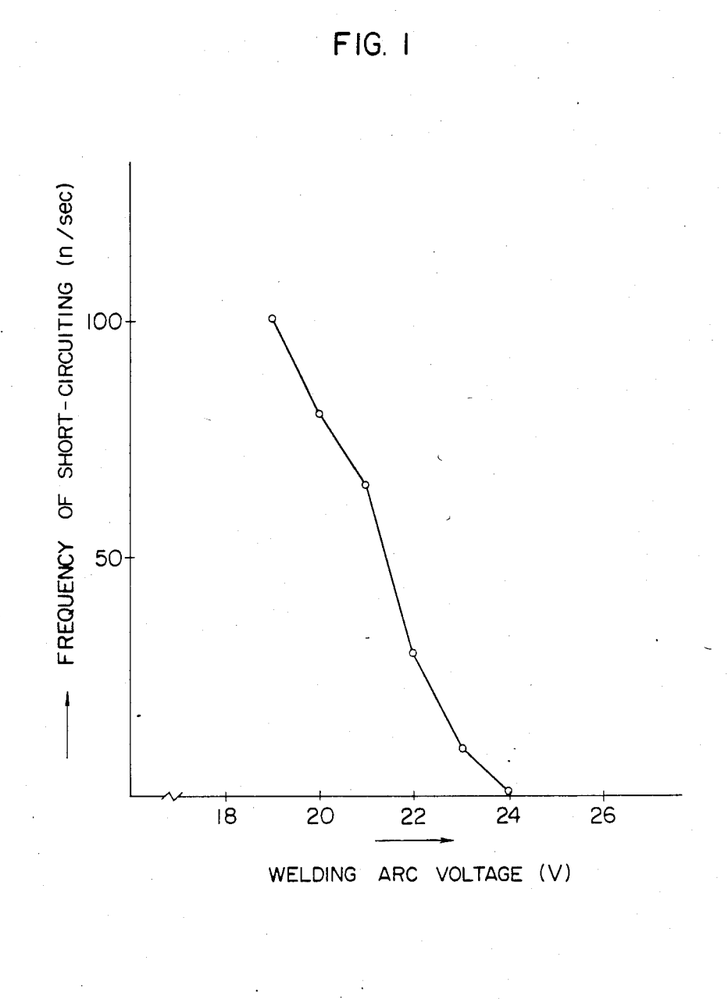
FIG. 1 is a graph showing the relationship between the welding arc voltage and the frequency of short-circuiting.

FIG. 1 is a graph showing the relationship between the welding arc voltage and the frequency of short-circuiting when the wire is fed at a rate of 6.3 m/min (the wire diameter is 1.2 mm$\phi$). It is seen that the frequency of short-circuiting is increased greatly as the arc voltage decreases; while no short-circuit occurs at the arc voltage of 24 V or higher.

Figure 2:
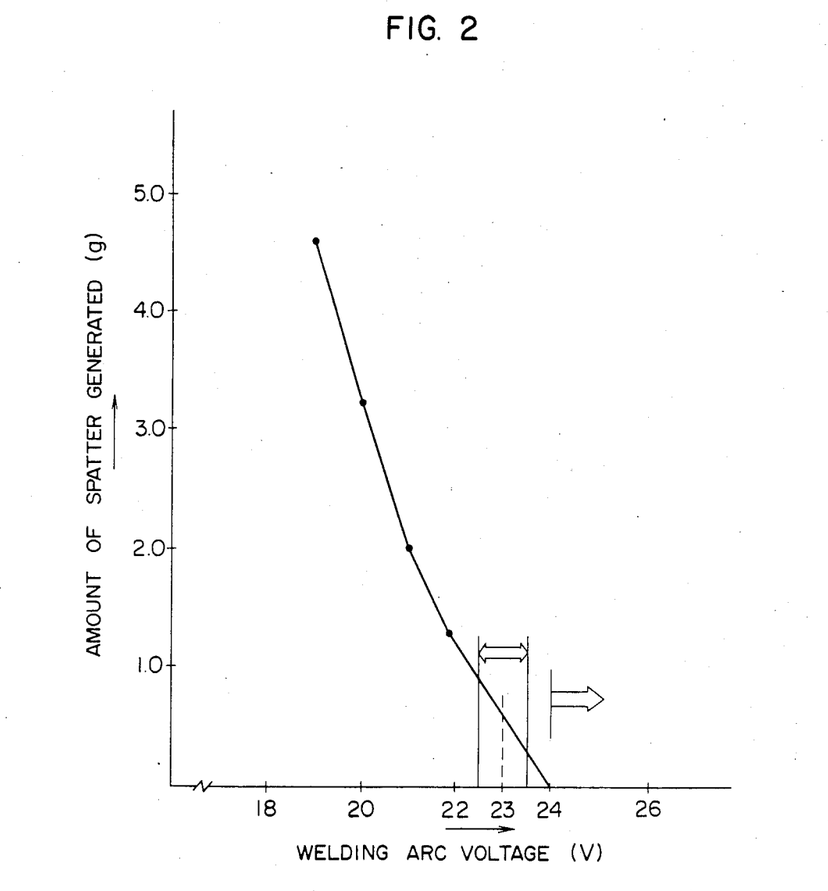
FIG. 2 is a graph showing the relationship between the welding arc voltage and the amount of a spatter generated.

FIG. 2 is a graph showing the relationship between the welding arc voltage and the amount of a spatter generated under the same welding condition as in the case of FIG. 1. It is seen that the generation of a spatter increases with a decrease in the welding arc voltage, that is, with an increase in the frequency of short-circuiting. At the welding arc voltage of 24 V or higher, no short-circuiting occurs and almost no spatter is generated. The detailed experimental results show that when the welding arc voltage is raised to 24 V or higher, undesirable welding defects such as undercut appear with an increase in the welding speed. When the welding arc voltage is at a lower level, on the other hand, any undercut does not occur even in the case of high speed welding, but the generation of a spatter increases undesirably. It has thus been found that, when the arc voltage is in the range of 23±0.5 V, as shown in FIG. 1, the number of times of short-circuiting is not more than 20 per sec and the amount of a spatter generated is small, thereby making it possible to effect the most satisfactory welding. The arc length involved in this case is about 4 mm.

As described above, the conditions under which the pulse MIG welding method shows its features are quite limited. As seen from the example illustrated in FIGS. 1 and 2, the welding arc voltage has a tolerance of only about one volt. Further, the adequate voltage value depends greatly on the welding position, joint form, kind of a gas and other welding work conditions. With regard to the joint form, for example, an optimum voltage value for the fillet welding is lower by about 0.5 V than that for the flat butt welding.

As described above, the problems in the pulse MIG welding method reside not only in the fact that the conditions for an adequate voltage are limited but also in the fact that the adequate welding conditions depend on the welding work conditions. As a result, there has been great difficulty in performing the welding work, and it has been a great problem in the field welding operation.

SUMMARY OF THE INVENTION

The present invention contemplates to solve the above-described problems, and the object of the present invention is to provide an apparatus in which the arc length may always be regulated at an adequate value.

According to the present invention, in a consumable electrode type pulse arc welding machine in which the number of times of short-circuiting between an electrode wire and a weld part of a base metal occurring during the welding operation is detected at regular time intervals (hereinafter referred to as "the sampling time"), and the resulting short-circuiting detection signal is used to regulate the welding arc voltage, thereby controlling the welding output, when $n_d(=n_s-n)>0$ holds, where $n_d$ represents a difference between a preset number of short-circuiting times $n_s$ and a number of times of short-circuiting n detected within the sampling time, the welding arc voltage is decreased according to the difference $n_d$, while when $n-n_s>0$ holds, the welding arc voltage is increased according to the difference $n_d$ thereby to control the welding output.

BRIEF DESCRIPTION OF THE DRAWINGS

The above and other objects, features and advantages will be made apparent by the detailed description taken in conjunction with the accompanying drawings, in which.

DESCRIPTION OF THE PREFERRED EMBODIMENTS

Figure 3:
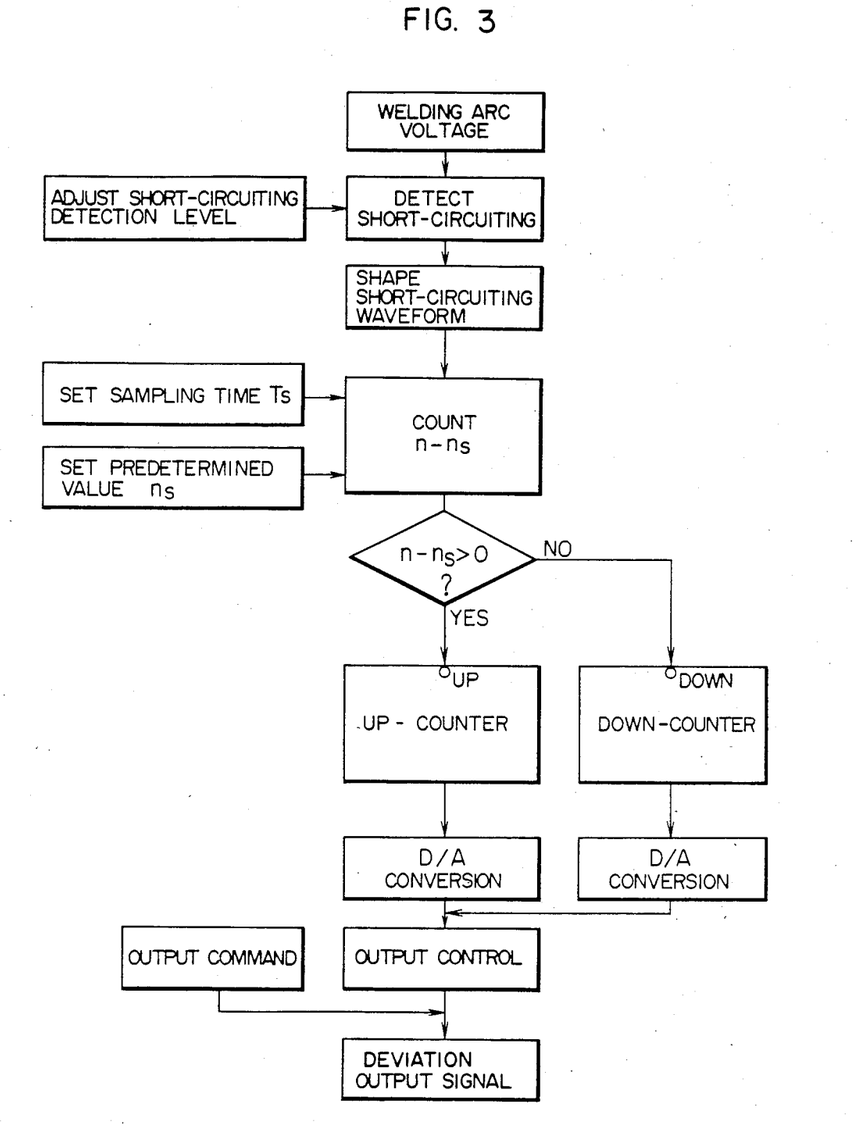
FIG. 3 is a flowchart for explaining the operation performed by the welding machine of the present invention.

A flowchart for explaining the operation performed by the welding machine of the present invention is shown in FIG. 3. The process of the operation will be described hereunder.

A short-circuiting detection level adjusting circuit inputs a welding arc voltage and cuts off a portion of the welding arc voltage higher than a predetermined level to produce a short-circuiting waveform and then this short-circuiting waveform is shaped to obtain a short-circuiting (detection) pulse. The number n of the short-circuiting pulses within the sampling time Ts is counted, and the difference $n_d$ between n and a preset number of pulses $n_s$ is obtained. If $n-n_s>0$ holds, the pulses representing the difference $n_d$ are applied to an up-counter, while, if $n_s-n>0$ holds, the pulses representing the difference $n_d$ are applied to a down-counter. The digital output of the counters is converted into an analog value through a D/A converter. This analog output is adjusted, and the adjusted analog output is compared with an output command signal for the welding machine to produce a deviation output signal, thereby controlling the output of the welding machine.

Figure 4:
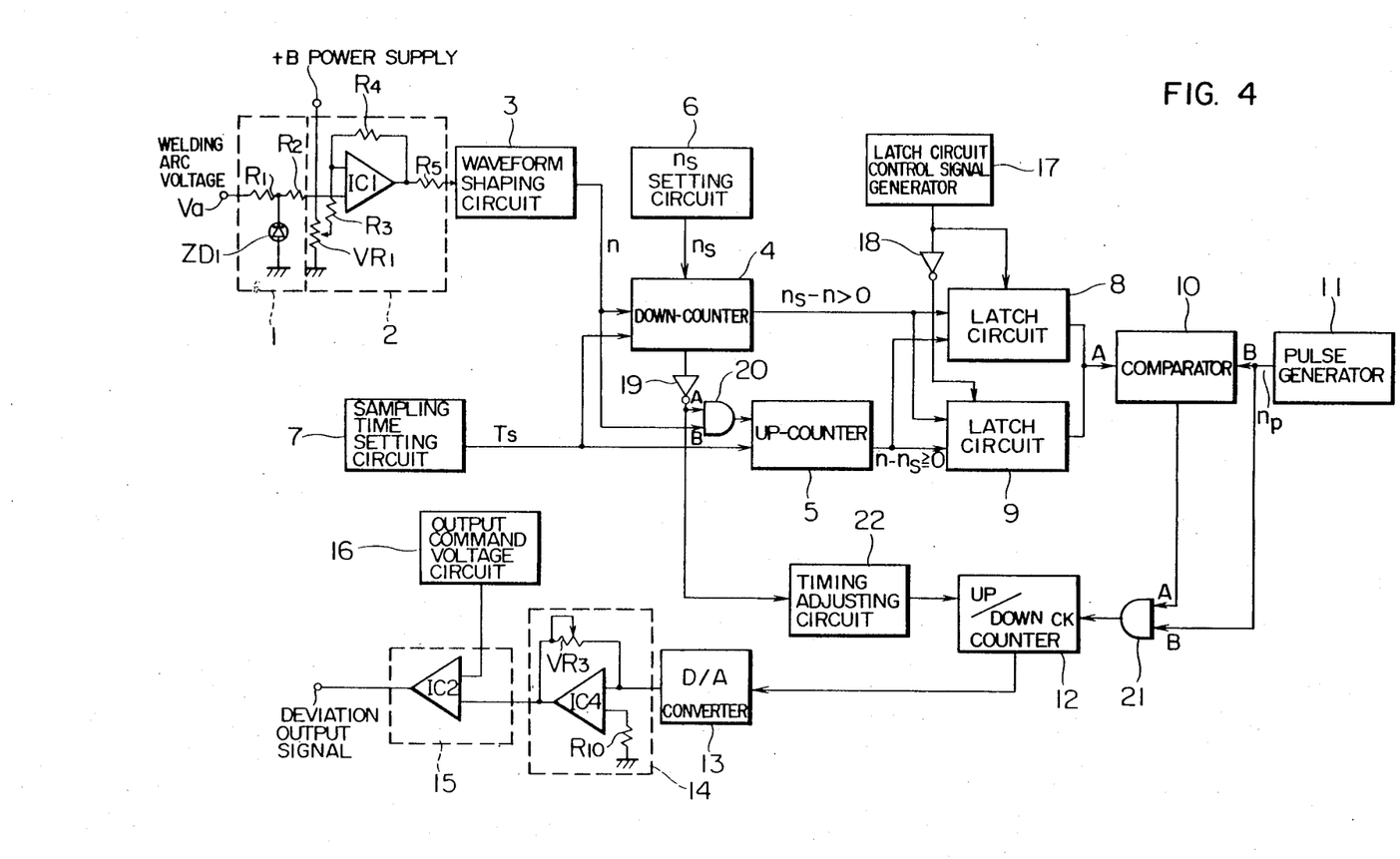
FIG. 4 is a block diagram showing the construction of the welding machine according to an embodiment of the present invention.

FIG. 4 shows a block diagram showing an example of the construction of the welding machine of the present invention. Reference numeral 1 designates a short-circuiting detector circuit, numeral 2 a short-circuiting detection level adjusting circuit, numeral 3 a waveform shaping circuit, numeral 4 a down-counter, numeral 5 an up-counter, numeral 6 a predetermined value $n_s$ setting circuit, numeral 7 a sampling time setting circuit, numeral 8, 9 a latch circuit, respectively, numeral 10 a comparator, numeral 11 a pulse generator, numeral 12 an up-down counter, numeral 13 a D/A converter, numeral 14 a gain control circuit, numeral 15 a deviation output circuit, numeral 16 an output command voltage circuit, numeral 17 a latch circuit control signal generator circuit, numeral 18, 19 an inverter circuit, respectively, numeral 20, 21 an AND circuit, respectively, and numeral 22 a timing adjusting circuit.

Figure 5:
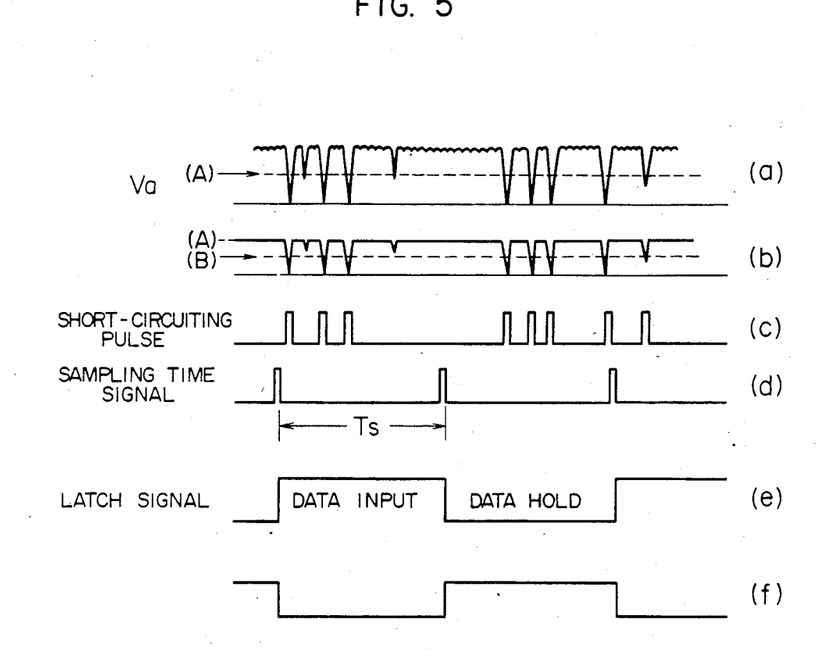
FIG. 5 is a waveform diagram showing output voltage waveforms generated in the circuits shown in FIG. 4.

FIG. 5 shows output voltage waveforms generated in the circuits shown in FIG. 4. In FIG. 5, (a) designates a welding arc voltage waveform $v_a$, (b) an output waveform of the short-circuiting detector circuit 1, (c) short-circuiting (detection) pulses, (d) pulses for setting the sampling time Ts, (e) an output waveform of the latch circuit control signal generator circuit 17, and (f) an inverted output waveform of the latch circuit control signal generator circuit 17.

Now, the construction and operation of the circuits of the welding machine of this invention will be explained with reference to FIGS. 4 and 5.

The short-circuiting detector circuit 1 includes resistors $R_1$, $R_2$ and a zener diode $ZD_1$. The voltage waveform $v_a$ shown at (a) in FIG. 5 input to this circuit is cut at a level (A) by the zener diode $ZD_1$ to produce a waveform shown at (b).

The signal of the welding arc voltage $v_a$ is normally a voltage signal appearing between the welding torch and the welding base metal. In the absence of a welding arc, there appears a no-load voltage whose value is extremely high as compared with the welding arc voltage. The zener diode $ZD_1$ operates to prevent the control circuit of the present invention from being destroyed by this high voltage. The short-circuiting detection level adjusting circuit 2 comprises resistors $R_3$, $R_4$ and $R_5$, a variable resistor $VR_1$, and an operational amplifier $IC_1$. It is possible to adjust the short-circuiting detection level by adjusting the variable resistor $VR_1$. This operation is represented by the adjustment of the detection level shown by (B) at FIG. 5(b). When the voltage waveform shown below the detection level B in (b) is applied to the waveform shaping circuit 3 in FIG. 4, an output pulse waveform having a constant pulse duration and voltage as shown at FIG. 5(c) is obtained.

Thus, each of the portions of the welding arc voltage $v_a$, where short-circuiting occurs, is indicated by a rectangular pulse waveform. This pulse is applied to the down-counter 4. The predetermined value $n_s$ setting circuit 6 sets a predetermined value $n_s$ for the down-counter, and the sampling time setting circuit 7 sets the sampling time Ts for the down-counter 4. As indicated between the pulses for setting the sampling time Ts in FIG. 5(d), the pulse duration Ts represents the sampling time. Upon application of the short-circuiting pulses shown at FIG. 5(c) to the down-counter 4, the output of the down-counter 4 is counted down from the preset value $n_s$ in response to the number of short-circuiting pulses n occuring during the sampling time. If the number of short-circuiting pulses n is smaller than the preset value $n_s$, namely, if the relation $n<n_s$ holds, the output $n_d$ of the down counter 4 (which is equal to $n_s$ minus n) is applied to the latch circuits 8 and 9. Numeral 17 designates a latch circuit control signal generator circuit which produces an output waveform shown at FIG. 5(e). When the latch signal (e) input to the latch circuit 8 is at a "high" level, the latch circuit 8 inputs a short-circuiting pulse signal from the counter 4, while, when the latch signal (e) is at a "low" level, the latch circuit 8 holds data stored therein. The latch signal (e) is applied also to the latch circuit 9 through the inverter circuit 18. The latch signal (f) thus applied is shown in FIG. 5. The latch signals (e) and (f) are in opposite phase to each other. Although the output of the down-counter 4 is applied to both of the latch circuits 8 and 9 as mentioned above, while one of the latch circuits inputs a short-circuiting pulse, the other latch circuit does not input any short-circuiting pulse but it functions to hold the data of the previous cycle (data obtained one sampling time before).

Next, an explanation will be made of a case where the number of short-circuiting pulses n is larger than the preset value $n_s$, that is, when the relation $n \geq n_s$ holds.

When the number of short-circuiting pulses n becomes equal to the preset value $n_s$, the output $n_d$ of the down-counter 4, becomes zero. As a result, the carryout signal of the down-counter 4 changes from a "high" to a "low" level. This carry-out signal is converted through the inverter circuit 19 to a "high" level and this "high" level signal is applied to the terminal A of the AND circuit 20. The other terminal B of the AND circuit 20 is supplied with a short-circuiting pulse signal.

Thus, as is apparent from the foregoing description, when the number of short-circuiting pulses n becomes equal to the preset value $n_s$, the terminal A of the AND circuit 20 becomes a "high" level, and therefore the short-circuiting pulse signal is applied through the terminal B of the AND circuit 20 to the up-counter 5. The up-counter 5 is also supplied with a signal for determining the sampling time Ts from the sampling time circuit 7. The up-counter 5 is thus supplied with a number $n_d(=n-n_s)$ of pulses exceeding the preset number of pulses $n_s$. At first, the up-counter 5 is set to zero. Therefore, the output of the up-counter 5 is $n_d$. This output pulse is applied to the latch circuits 8 and 9. Thus, when the number of short-circuiting pulses n generated during the sampling time Ts is smaller than the preset number of pulses $n_s$, the difference pulse number $n_d(=n_s-n)$ is produced from the down-counter 4 and applied to the latch circuits 8 and 9. On the other hand, if the number of short-circuiting pulses n generated during the sampling time Ts is equal to or larger than the preset number of pulses $n_s$, that is, when the relation $n \geq n_s$ holds, the difference $n_d(=n-n_s)$ is produced from the up-counter 5 and applied to the latch circuits 8 and 9. As described above, the latch circuits 8 and 9 operate alternately, so that when one of them is supplied with an input signal, the other of them holds the previous data $n_d$ applied thereto in a preceding cycle. The data thus held is applied to the input terminal A of the comparator 10. The input terminal B of the comparator 10 is supplied with a pulse $n_p$ from the pulse generator 11. The comparator 10 compares the input data applied to its two input terminals A and B. The output of the comparator 10 is applied to the input terminal A of the AND circuit 21. The output of the comparator 10 remains "high" until the number of pulses $n_p$ applied to its input terminal B becomes equal to the number of pulses $n_d$ set at its input terminal A. However, if the pulses $n_p$ whose number is higher than that of the pulses $n_d$ are applied to the input terminal B of the comparator 10, the output of the comparator 10 becomes "low". Since the output of the comparator 10 is connected to the terminal A of the AND circuit 21, a number of pulses $n_p$ equal to the number of pulses $n_d$ are applied from the pulse generator 11 through the AND gate 21 to the up-down counter 12.

The up-down control terminal of the up-down counter 12 is supplied with the carry-out signal of the down-counter 4. The carry-out signal of the down-counter 4 is "high" when the relation $n_s-n>0$ holds, and it is inverted to a "low" level through the inverter circuit 19. When this "low" signal is applied to the up-down control terminal of the up-down counter 12, then the up-down counter 12 operates as a down-counter. On the other hand, when the relation $n-n_s 0$ holds, the carry-out signal is a "low" level and it is inverted to a "high" level through the inverter circuit 19. When this "high" level signal is applied to the up-down control terminal of the up-down counter 12, then the counter 12 operates as an up-counter. The carry-out signal passing through the inverter circuit 19 is supplied to the up-down counter 12 through the timing circuit 22. Since the output pulses $n_d$ from the down-counter 4 and the up-counter 5 are latched temporarily in the latch circuits 8 and 9, the timing of application of the pulses $n_d$ to the up-down counter 12 does not coincide with that of the carry-out signal of the down-counter 4. The timing of application of the carry-out signal is adjusted by the timing adjusting circuit 22. The output of the up-down counter 12 is applied to the D/A converter 13 so that the digital signal is converted to an analog signal.

When the relation $n_s-n>0$ holds, the up-down counter 12 operates as a down-counter, so that the output digital value of the up-down counter 12 decreases by the number of pulses $n_d=n_s-n$. On the other hand, when the relation $n-n_s \geq 0$ holds, the up-down counter 12 operates as an up-counter, with the result that the output of the up-down counter 12 increases by the number of pulses $n_d=n-n_s$. Numeral 14 designates a gain control circuit for controlling the magnitude of the analog output of the D/A converter, and the output of the gain control circuit 14 is connected to the deviation output circuit 15.

Numeral 16 designates an output command voltage circuit including constituent elements such as a remote controller for adjusting the output of the welding machine. The output signal of the output command voltage circuit 16 and the output signal of the gain control circuit 14 are supplied to the deviation output circuit 15 constituted mainly by an operational amplifier $IC_2$, the output of which is applied to a control circuit of an output control element (not shown) for the welding machine to control the welding output.

As is seen from the foregoing description, when the welding arc voltage $v_a$ is so high that the number of short-circuiting pulses n generated during the sampling time Ts is smaller than the preset number of pulses $n_s$, the output of the deviation output circuit 15 is reduced by the difference pulse number $n_d$ to decrease the output voltage of the welding machine, thereby controlling to increase the number of short-circuiting pulses n. On the other hand, when the welding arc voltage $v_a$ is low and therefore the number of short-circuiting pulses n generated during the sampling time Ts is greater than the preset number of pulses $n_s$, the output of the deviation output circuit 15 is increased by the difference pulse number $n_d$ to increase the output voltage of the welding machine, thereby controlling to reduce the number of short-circuiting pulses n. That is, if the number of times short-circuiting occurs at the weld part is greater than the a preset value, the welding output voltage is immediately increased to prevent the number of short-circuiting times from increasing, while, if the number of short-circuiting times is detected to be smaller than the preset value, the welding output voltage is immediately decreased to maintain an adequate arc length.

Here, when comparing a case where a constant arc length is reached by increasing the welding arc voltage with a case where a constant arc length is reached by decreasing the welding arc voltage, there is a difference in the response time between both cases. The reason therefor is as follows.

When the relation $n<n_s$ holds, the difference $n_d=n_s-n$ becomes maximum when $n=0$, that is, when $n_d=n_s$. In other words, the value of the difference $n_d$ can not be greater than the value of $n_s$. On the other hand, when the relation $n>n_s$ holds, the value of the difference $n_d=n-n_s$ becomes considerably greater than the value of $n_s$ when the welding arc voltage is low and the value of n is great. Thus, it results that, when $n<n_s$ holds, the maximum value of the difference therebetween is defined to be $n_s$, while, when $n_s<n$ holds, there is no limit to a maximum value of n. As a result, there is a case where imbalance occurs in a practical arc between an increase and decrease in the welding arc voltage. In such a case, the welding arc becomes unstable.

This tendency is conspicuous especially when the value of $n_s$ is initially set to a small value.

With respect to the above-mentioned fact, it is possible to prevent the occurrence of such imbalance by setting an arc voltage decrease for the difference $n_d$ to a value greater than an arc voltage increase for the difference $n_d$ of the same magnitude.

Figure 6:
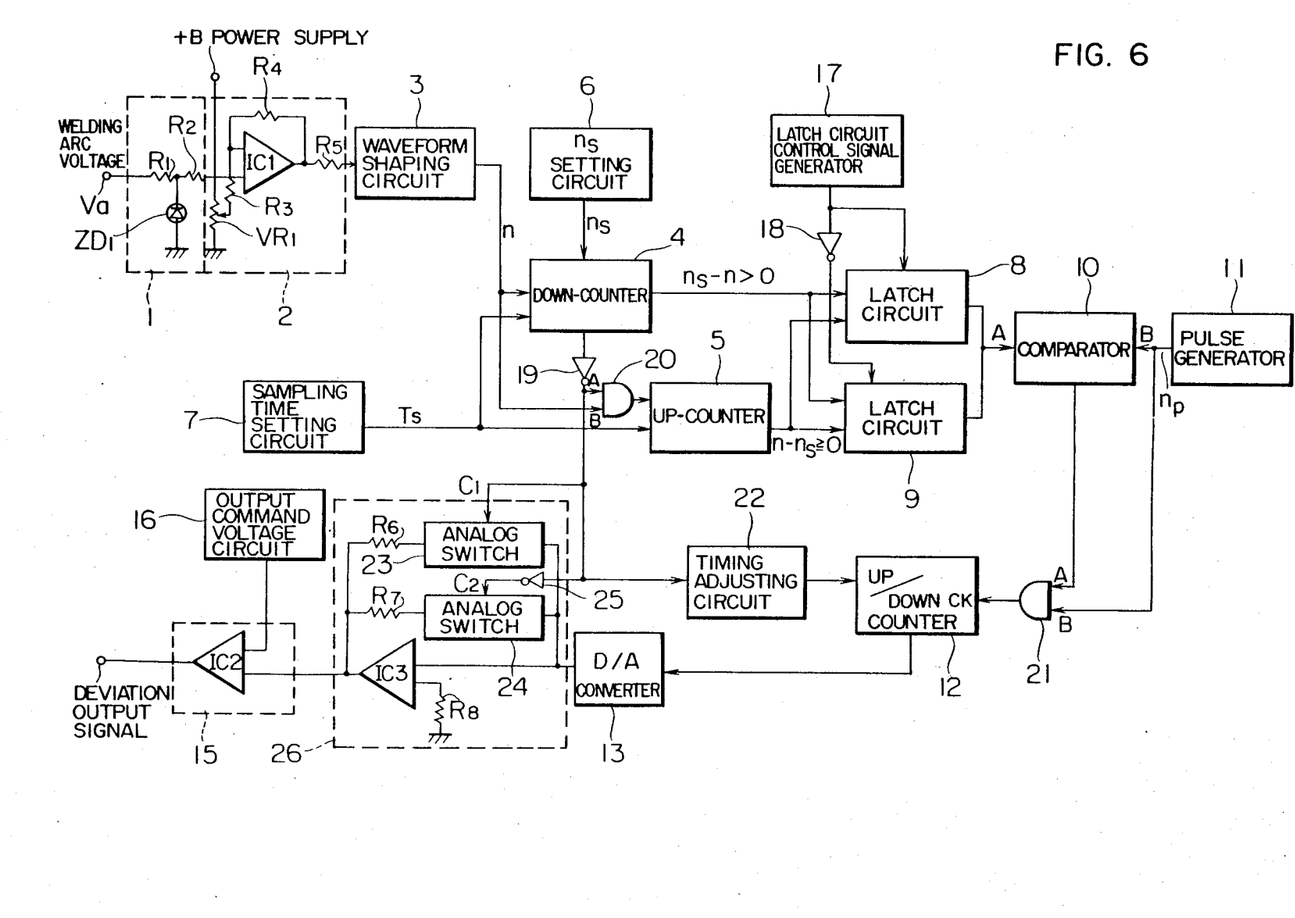
FIG. 6 is a block diagram showing an exemplifying circuit construction in which the gain control circuit 14 in FIG. 4 is replaced by the up-down gain control circuit 26 whose gain changes in accordance with a decrease or an increase in the arc voltage.

Namely, it is possible to solve this problem by making the control circuit have a different gain between an increase and decrease in the welding arc voltage. A construction of the control circuit devised taking the matter into consideration will be explained with reference to FIG. 6. In FIG. 6, the same reference numerals as those shown in FIG. 4 designate the same or like elements as those shown in FIG. 4.

The difference in the construction between FIGS. 4 and 6 resides in the gain control circuit. The gain control circuit 14 in FIG. 4 is replaced by an up-down gain control circuit 26 in FIG. 6. The operation of this circuit will be explained below.

The up-down gain control circuit 26 is provided to control the analog output of the D/A converter 13, and it comprises resistors $R_6$, $R_7$, $R_8$, an operational amplifier $IC_3$ and analog switches 23 and 24. The analog switches 23 and 24 have respective control terminals $C_1$ and $C_2$. Upon application of a "high" level input signal to each of the control terminals $C_1$ and $C_2$, the impedance between the input and output of each of the analog switches 23 and 24 becomes low, while, upon application of a "low" level input signal to the control terminals $C_1$ and $C_2$, the impedance between the input and output thereof becomes high.

The input signal to the timing adjusting circuit 22 becomes "high" when the relation $n - n_s \geq 0$ holds, and it becomes "low" when the relation $n_s - n > 0$ holds. This input signal is applied to the control terminal $C_1$ of the analog switch 23 on the one hand, and it is inverted through the inverter 25 and applied to the control terminal $C_2$ of the analog switch 24 on the other hand. Thus, when $n - n_s \geq 0$ holds, that is, when the updown counter 12 operates as an up-counter, the output of the D/A converter 13 passes through the up-down gain control circuit 26 whose gain is determined by the resistor $R_6$, since the impedance between the input and output of the analog switch 23 of the up-down gain control circuit 26 becomes low (while, when the impedance between the input and output of the analog switch 24 becomes high). While, when $n_s - n > 0$ holds, that is, when the up-down counter 12 operates as a down-counter, the output of the D/A converter 13 passes through the up-down gain control circuit 26 whose gain is determined by the resistor $R_7$, since the impedance between the input and output of the analog switch 24 of the up-down gain control circuit 26 becomes low (while, when the impedance between the input and output of the analog switch 23 becomes high). The impedance of the resistor $R_7$ is chosen to be greater than that of the resistor $R_6$. In other words, when the up-down counter 12 operates as a down-counter, the analog output of the D/A converter 13 is controlled through the up-down gain control circuit 26 with a gain higher than that when the up-down counter 12 operates as an up-counter.

With this construction of the up-down gain control circuit, 26 the welding arc voltage decrease for a difference $n_d$ becomes greater than the welding arc voltage increase for the difference $n_d$ of the same magnitude.

This is to say, a more stable welding arc can be obtained by controlling an output voltage change for a difference $n_d$ of the common magnitude, that is, by controlling the gain of the control circuit.

The embodiments of the present invention shown in FIGS. 4, and 6 are comparatively complicated in the circuit construction. A schematic explanation will be given hereunder of a system of another embodiment of the present invention which makes use of a microcomputer and which is less complicated.

In this system, the number of times short-circuiting occurs between an electrode wire and a base metal during a welding operation is counted by a microcomputer at regular time intervals (at every sampling time Ts), and the difference $(n_s - n)$ between the number of times of short-circuiting n thus counted and a short-circuiting constant $n_s$ stored beforehand in a storage device such as ROM is calculated. When the number of times of short-circuiting is equal to $n_m$ and the difference $(n_s - n_m)$ is equal to or greater than zero, namely, when $n_s - n_m \geq 0$ holds, the value $(n_s - n_m)$ is substracted from an initial value $n_0$ to obtain a value of $n_1 = n_0 - (n_s - n_m)$. While, when the number of times of short-circuiting is equal to $n_n$ and $n_s - n_n < 0$ holds, the value $(n_n - n_s)$ is added to $n_0$ to obtain a value of $n_2 = n_0 + (n_n - n_s)$. These values $n_1$ and $n_2$ are converted into analog values, each of which is used as a feedback signal for controlling a welding output.

Figure 7:
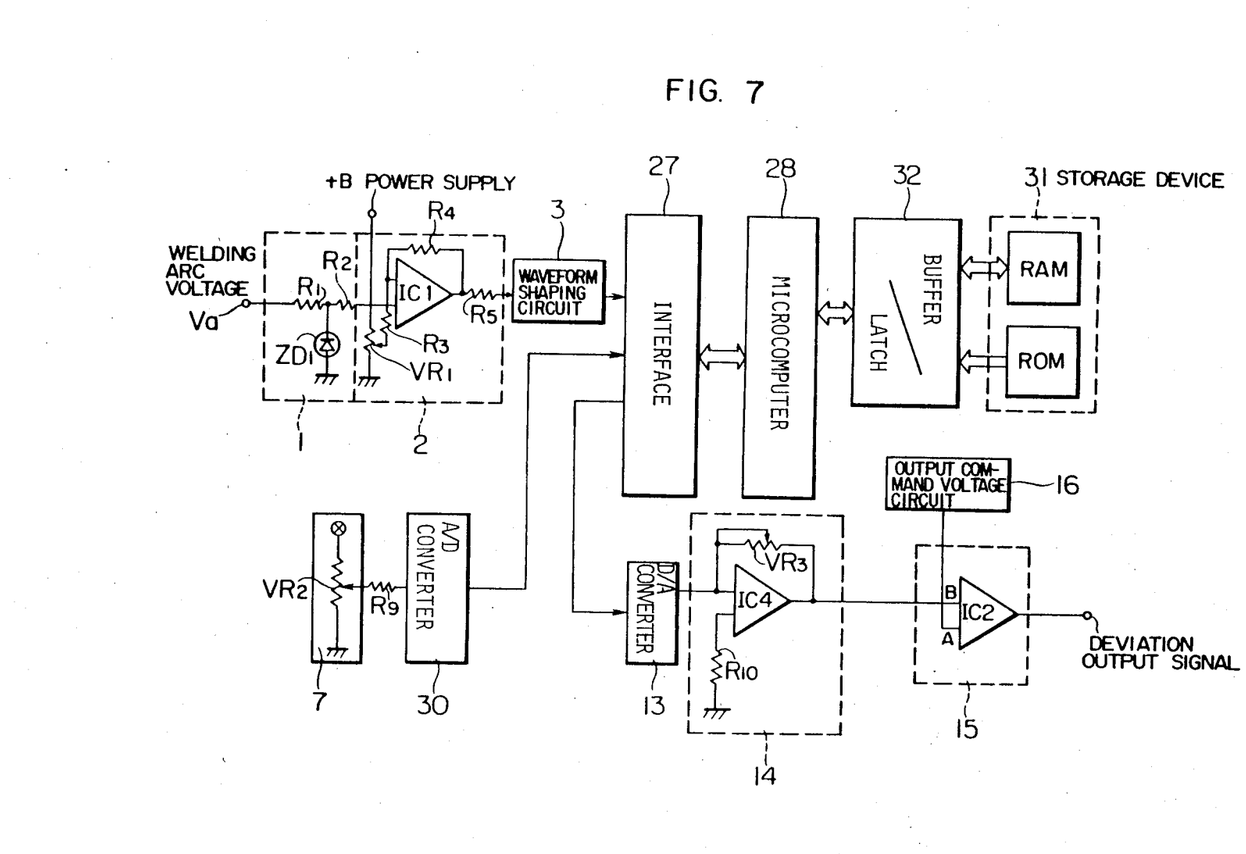
FIG. 7 is a block diagram showing the construction of the welding machine according to a further embodiment of the present invention which employs a microcomputer.

FIG. 7 is a block diagram showing a construction of an embodiment of the present invention according to the foregoing analysis. In FIG. 7, numeral 1 designates a short-circuiting detector circuit, numeral 2 a short-circuiting detection level adjusting circuit, and numeral 3 a waveform shaping circuit, in the same manner as FIG. 4.

The number of pulses generated from the waveform shaping circuit 3 in response to the occurrence of short-circuiting during a welding operation is read by the microcomputer 28 through an interface 27. Numeral 7 designates a sampling time setting circuit for setting a sampling time Ts, and it is composed of a variable resistor VR2. The value of the variable resistor VR2 is applied through a resistor R9 to an A/D converter 30 and is converted into a digital value by the A/D converter 30. Then, this digital value is sent through the interface 27 to the microcomputer 28 to be read thereby. Numeral 31 designates a storage device including ROM, RAM, etc. and it is connected to the microcompuer 28 through a buffer and latch circuit 32.

Next, the processing operation performed by the microcomputer 28 will be explained. The microcomputer 28 starts its operation in accordance with a program stored in the storage device 31. First, the microcomputer 28 reads the number of short-circuiting pulses n occurring during the sampling time Ts preset by the sampling time setting circuit 7. Then, the microcomputer 28 calculates a difference $(n_s - n)$ between this number n and a short-circuiting constant $n_s$ stored in the storage device 31. If the relation $n_s - n \geq 0$ holds, $(n_s - n)$ is subtracted from an initial value $n_0$ to obtain the value $n_1 = n_0 - (n_s - n)$. While, when the relation $n_s - n < 0$ holds, $(n - n_s)$ is added to $n_0$ to obtain the value $n_2 = n_0 + (n - n_s)$.

Each of the digital values of $n_1$ and $n_2$ thus calculated by the microcomputer 28 is converted into an analog value through a D/A converter 13. Numeral 14 designates a gain control circuit for controlling the magnitude of the analog output from the D/A converter 13.

The output of the gain control circuit 14 is supplied to a deviation output circuit 15 which is constituted mainly by an operational amplifier IC$_2$. The gain control circuit 14 comprises a resistor R$_{10}$, a variable resistor VR$_3$ and an operational amplifier IC$_4$. The magnitude of the output signal from the gain control circuit 14 is controlled by the adjustment of the impedance value of the variable resistor VR$_3$.

Numeral 16 designates an output command voltage circuit including a remote controller for adjusting the output of the welding machine. The output signal from the output command voltage circuit 16 is applied to a terminal A of the deviation output circuit 15, while, the other terminal B of the deviation output circuit 15 is supplied with an output signal from the gain control circuit 14. The output of the deviation output circuit 15 is applied to a control circuit of an output control element (not shown) for the welding machine to control the welding output.

As will be seen from the above description, when the welding arc voltage v$_a$ is high and the number of short-circuiting pulses n generated during the sampling time Ts is smaller than the preset short-circuiting constant n$_s$, the output of the deviation output circuit 15 is decreased by a difference n$_d$(=n$_s$−n) thereby to decrease the output voltage of the welding machine, thereby increasing the number of short-circuiting pulses. On the other hand, if the welding arc voltage v$_a$ is low and the number n of short-circuiting pulses is greater than the preset short-circuiting constant n$_s$, the output of the deviation output circuit 15 is increased by a difference n$_d$(=n−n$_s$) thereby to increase the output voltage of the welding machine, thereby decreasing the number of short-circuiting pulses.

As mentioned previously, if the microcomputer 28 is programmed so that the welding arc voltage decrease for a difference in the pulse number is greater than the welding arc voltage increase for the difference of the same magnitude, it is possible to improve a response in changing the electrode extension.

It will be understood from the foregoing description that, the present invention provides a novel welding machine capable of performing output voltage control for the pulse MIG welding in which a gas containing an inert gas as a main component is used and a consumable electrode wire is fed to a weld part to effect fusion welding by using a pulsating welding current. In the welding machine of this invention, the welding arc voltage is increased to prevent the occurrence of short-circuiting from being increased as soon as short-circuiting occurs at a rate higher than a preset value, while, the welding arc voltage is decreased to provide a proper arc length (which allows the number of short-circuiting times to approach the preset value n$_s$) as soon as the welding arc voltage increases to reach a state such that short-circuiting occurs less frequently than the preset value n$_s$.

As a consequence of the above-described control, the arc length is always regulated at an adequate value, and therefore the welding arc becomes very stable and it is possible to perform a satisfactory welding operation with only a small amount of spatter. Further, even when the distance between a welding torch and a weld part varies due to an unstable manual operation by the operator, the arc length can be maintained constant. Therefore, the welding operation for setting the welding conditions requiring a considerable degree of skill which has so far been necessary can be eliminated, thereby remarkably improving the welding efficiency and the economy of the welding work.

Furthermore, in spite of the fact that an adequate output value of the welding output is affected by the welding position, joint form, gas type and other welding conditions, the welding machine of the present invention always regulates the arc length to provide an adequate number of short-circuiting times, so that it is possible to effect an efficient welding operation with excellent efficiency.

I claim:

1. A pulse arc welding machine of the consumable electrode type, comprising:
   a short-circuiting detection circuit means for detecting short-circuiting occurring in a welding operation between a consumable electrode and a weld part of a base metal and producing output pulses representing the times of short-circuiting;
   means, including an up/down-counter means, connected to said short-circuiting detection circuit means for counting the output pulses from said short-circuiting detection circuit means during respective predetermined sampling time periods to obtain a counted number of times of short-circuiting n and producing a difference n$_d$=n$_s$−n between a preset number of times of short-circuiting n$_s$ and the counted number of times of short-circuiting n, said up/down-counter means counting down in proportion to the difference n$_d$ when the relation n$_d$>0 holds, and counting up in proportion to the difference n$_d$ when the relation n$_d$≦0 holds;
   digital-to-analog converter means connected to said up/down counter means for receiving an output count of said up/down-counter means and performing digital-to-analog conversion of such output count to produce an analog signal corresponding thereto; and
   control means connected to the output of said digital-to-analog converter means for controlling a welding output voltage of said pulse arc welding machine in dependence of the difference n$_d$ by using the analog output signal from said digital-to-analog converter.

2. A pulse arc welding machine according to claim 1, wherein said control means includes gain control circuit means for automatically adjusting the magnitude of said analog signal in dependence of whether the relation n$_d$>0 holds or the relation n$_d$≦0 holds, respectively, and wherein said control means decreases the welding output voltage by an amount corresponding to the magnitude of n$_d$, when n$_d$ is larger than zero, and increases the welding output voltage by an amount corresponding to the magnitude of n$_d$ when n$_d$ is smaller than zero.

3. A pulse arc welding maching of the consumable electrode type, comprising:
   a short-circuiting detection circuit means for detecting short-circuiting occurring in a welding operation between a consumable electrode and a weld part of a base metal and producing output pulses representing the times of short-circuiting;
   storage means for storing a preset number of times of short-circuiting n$_s$;
   a microcomputer means connected for counting the output pulses from said short-circuiting detection circuit means during respective predetermined sampling time periods, thereby obtaining a counted number of times of short-circuiting n, said microcomputer means being connected for receiving said preset number of times of short-circuiting $n_s$ stored in storage means, said microcomputer means calculating a difference $n_d = n_s - n$ between the preset number of times of short-circuiting $n_s$ and the counted number of times of short-circuiting n, and further calculating welding output control quantities $n_1$, and $n_2$, where $n_1 = \{n_0 - (n_s - n_m)\}$, with $n_0$ denoting a constant value and n being equal to $n_m$ when the relation $n_d \geq 0$ holds, and $n_2 = \{n_0 + (n_n - n_s)\}$, with n being equal to $n_n$, when the relation $n_d < 0$ holds;

digital-to-analog converter means coupled for receiving the calculated output values $n_1$ and $n_2$, respectively, from said microcomputer and performing digital-to-analog conversion of such calculated output values for producing an analog signal corresponding thereto; and control means connected to said digital-to-analog converter means for controlling a welding output voltage of said pulse arc welding machine in accordance with the difference $n_d$ by using the analog output signal from said digital-to-analog converter as a feedback signal.

4. A pulse arc welding machine according to claim 3, wherein said microcomputer means alters the relative magnitude of the calculated output value of $n_1$ and $n_2$ automatically depending on whether the relation $n_d \geq 0$ holds or the relation $n_d < 0$ holds, respectively, and wherein said control means decreases the welding output voltage in accordance with the magnitude of $n_d$, when $n_d$ is larger than zero, and increasing the welding output voltage in accordance with the magnitude of $n_d$, when $n_d$ is smaller than zero.

* * * * *